3,271,736
TRANSISTORIZED CIRCUIT CONDITION WARNING DEVICE FOR VEHICLES
Richard J. Brown, Rte. 4, Box 270, and Raymond G. Schnick, Rte. 4, Box 53, both of Delavan, Wis.
Filed Aug. 30, 1963, Ser. No. 305,694
3 Claims. (Cl. 340—52)

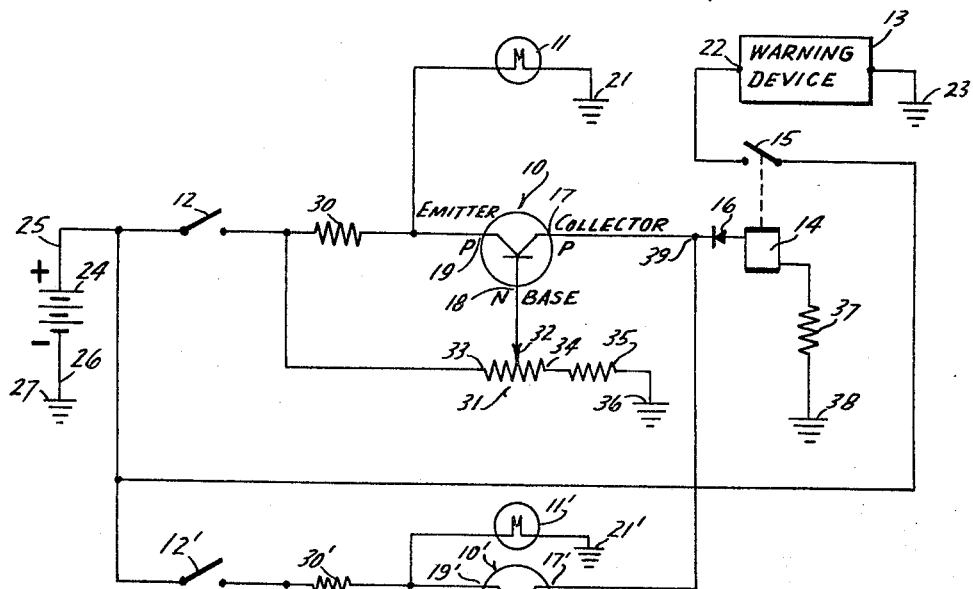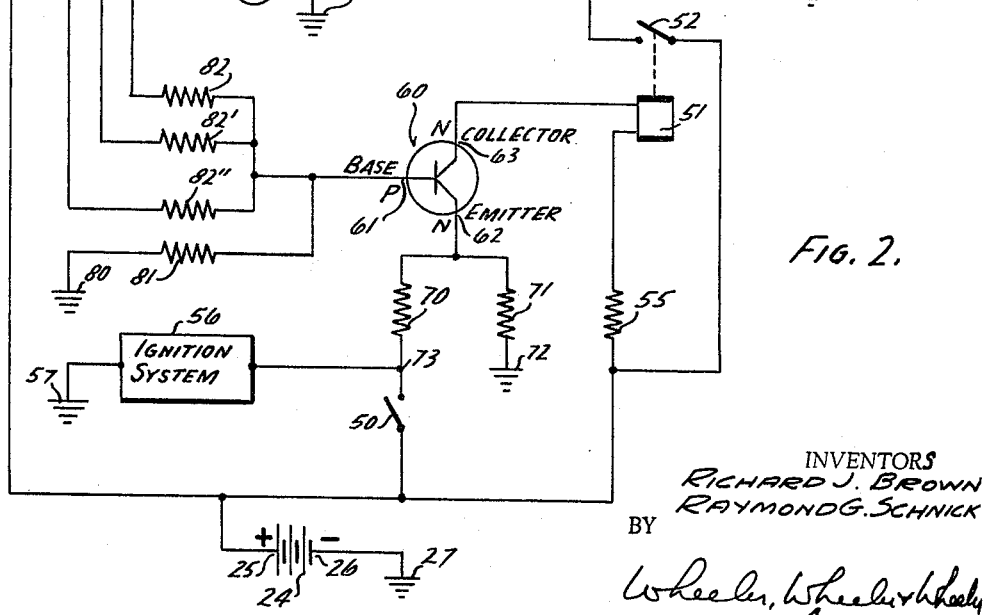

This invention relates to a transistorized circuit condition warning device for vehicles.

More particularly, the invention consists of a warning circuit or circuits in an automobile in which a warning device is actuated directly or indirectly by a transistor, only upon the occurrence of an undesired condition in another circuit of the automobile. In one embodiment, the network of resistances associated with the emitter and base terminals of the transistor are so connected to the normal circuits of the car as to permit a collector current to flow through the transistor only when a light bulb fails to operate and the switch for that particular bulb is on, thus warning the driver of the fact that the particular bulb is not operating. In another embodiment, the emitter and base terminals of the transistor are connected to the ignition system and to another circuit in the car in such a manner as to permit a collector current to flow in the transistor to actuate the warning device only when the ignition switch is off and the switch to the other electrical circuit is on, thus warning the driver that the other circuit has been left on while the car is stopped. The invention contemplates that the collector current of the transistor will be fed to the control coil of a relay which will actuate the warning device, but if the warning device does not require more current than the transistor can carry, the warning device may be connected directly to the collector terminal of the transistor.

In the case of a warning device which is actuated by the failure of a filament or other circuit to conduct electricity, one transistor is used for each circuit protected. In the case of a warning device which is actuated when the driver fails to turn off all electrical devices in the car upon turning off the ignition, a single transistor and warning circuit is used, regardless of the number of circuits protected. In each case, a single warning device and a single relay is used, regardless of the number of circuits protected, and any number of circuits within the automobile may be protected. The specific circuit as to which the warning has been given is located by manipulating the switches to the various circuits, since either warning circuit will operate only when the switch to the protected circuit is closed.

In the drawings:

FIG. 1 is a schematic drawing of the circuit required to warn of a burned out light, two such lights and protective circuits being shown.

FIG. 2 is a schematic diagram of the circuit required for giving a warning when a light switch is left on after the ignition switch is turned off, three such lights and circuits being shown.

Referring now to FIG. 1, the usual battery 24 has its negative terminal 26 grounded at 27, and all ground connections are thus connections to negative terminal 26. Connections to positive terminal 25 are made with insulated wiring. In a car having the positive terminal of the battery grounded, NPN transistors replace PNP transistors, and vice versa. No other change is required in the circuits disclosed herein.

Since the connections and operation of transistor 10, and any additional warning circuits, is identical to those of transistor 10, only that part of the circuit associated with transistor 10 is described.

Transistor 10 is a PNP transistor having the conventional emitter, base, and collector terminals. Lamp bulb 11 is representative of any electrical device within the car which may cease to conduct electrical current because the filament is burned out, or for any other reason. Switch 12 is the switch provided by the maker of the automobile for lamp 11. Warning device 13 is any warning device such as a pilot light or buzzer. As shown in FIG. 1, it is actuated by a relay including a control coil 14 and a switch 15 comprising contacts which are normally open, but are closed when a sufficient current flows through control coil 14. A resistor 37 may be placed in series with control coil 14 and ground 38 to obtain the proper resistance in the collector circuit, if needed to limit the current or the sensitivity of the collector-relay circuit.

The collector terminal 17 of transistor 10 is connected to control coil 14. The transistors may be protected by diode 16 which is connected to prevent a damaging flow of current of opposite polarity from that for which the transistors are designed. The collector terminal 17 of the transistor 10 will pass current to control coil 14 only when the base terminal 18 is negative with respect to emitter terminal 19.

A small resistance 30 is connected in series with the switch and the bulb. The emitter terminal 19 of transistor 10 is connected to the side of resistor 30 which is connected to bulb 11. A potentiometer 31 having a movable contact 32 is connected through movable contact 32 to base terminal 18 of transistor 10. The end contact 33 of potentiometer 31 is connected to the side of resistor 30 which is connected to switch 12. End contact 34 of potentiometer 31 is connected to resistor 35, the other end of which is grounded at 36. The lamp 11 is grounded at 21 in the usual manner. Warning device 13 is grounded at 23, and its other terminal 22 is connected through relay contacts 15 to the positive terminal 25 of battery 24.

A duplicate of this circuit with corresponding reference characters is shown in the lower portion of FIG. 1, to protect an additional lamp 11′, the collector terminal 17′ of transistor 10′ being connected at 39 with the same optional diode 16 and control coil 14 to which collector 17 is connected. Other like warning circuits may be added.

In the circuit constructed by applicant, the potentiometer 31 has a value of 25 ohms across terminals 33 and 34, resistor 35 has a value of 220 ohms, control coil 14 of the relay has a resistance of 500 ohms, resistor 37 has a resistance of 220 ohms, and each resistor 30 has a value adequate to cause a .3 volt voltage drop between its respective switch and the electrical device controlled by the switch. These values provide a circuit capable of operation with devices 11 varying from small light bulbs to headlights.

In operation, no current can flow at the collector unless there is current flow in the base-emitter circuit. That can only occur when the base is more negative than the emitter. Since this circuit is intended to actuate the warning device at a time when lamp 11 burns out or otherwise ceases to conduct current, it is necessary for correct operation that the base 18 of transistor 10 be negative with respect to the emitter 19 as to any protected circuit in which a burn-out occurs, while transistors 10′ in other circuits do not meet this condition. With the light switch 12 in the open circuit position, the transistor is connected to the battery only by negative ground connections, and no current flows. When switch 12 is closed, a positive bias is applied both to the emitter and to the base of the transistor, but due to the magnitudes of the respective resistances in the parallel circuits from switch 12 to emitter 19, and from switch 12 to base 18, the base remains positive with respect to the emitter. It is the function of potentiometer 31 to adjust the resistances in the circuit until this condition is met, as evidenced by the operation or non-operation of the warning device. The potentiometer 31 is initially set so that the warning device does not operate when bulb 11 is lit, but does operate when the bulb is removed from its socket, or otherwise disabled if it is some other device. For instance, an electric windshield wiper may be disconnected for this test by removing the wire at unit 11. After this adjustment is made in any particular circuit, potentiometer 31 may be replaced by a pair of resistors having values equal to those established in the sides of the potentiometer respectively provided with terminals 33 and 34. In general, resistors having the same values may replace potentiometer 31 in any other circuit having the same resistance in lamp (or other device) 11. In a standard device the resistance does not ordinarily have to be adjustable by means of a potentiometer 31 but may include a resistor of an appropriate value between the base of the transistor and switch 12, and a single resistor between the base of the transistor and ground connection 36 having a value equal to the combined resistances of leg 34 of the potentiometer 31 and resistor 35 shown in FIG. 1. Of course, if it is desirable to retain the adjustability of the circuit for any reason, potentiometer 31 is retained. For instance, if potentiometer 31 is retained in the circuit, the circuit may be adjusted to operate correctly when lamp 11 is replaced with a lamp having a different resistance.

This adjustment makes base 18 normally slightly positive with respect to emitter 19 and no current can flow between the base and emitter, because there is less resistance between base 18 and switch 12 than between emitter 19 and switch 12, and less resistance from negative pole 26 to the emitter 19 through lamp 11 than from negative pole 26 to base 18 through resistor 35 and potentiometer 31. There is thus no current flow in relay control coil 14, which is connected to the positive pole 25 of the battery 24 only through the respective collector 17 of the transistors 10, and the warning device 13 will not be actuated.

If bulb 11 is removed, or burns out, or if the circuit connection breaks for some reason, the current path from negative pole 26 through ground 21 and lamp 11 to emitter 19 is eliminated from the circuit. The base is now negative with respect to the emitter, since a connection to positive pole 25 through switch 12 intervenes between negative ground 36 and emitter 19. Thus, current will flow through the base-emitter circuit of the transistor. This in turn permits the flow of a collector current which is much greater than the current in the base-emitter circuit and which is sufficient to energize control coil 14, close relay contacts 15, and operate warning device 13. As no current can flow in transistor 10 while switch 12 is open, the driver of the vehicle has only to open any switches 12 which may be closed, until he locates the circuit which contains the burned out bulb or broken connection. Thus, through the use of transistor 10 and appropriate resistances, a warning circuit is provided which is actuated only when the undesired circuit condition occurs, and not when the circuit is operating normally. In particular, the warning circuit can discriminate between a circuit condition in which switch 12 is open and a circuit condition in which the circuit is open because of the burning out of lamp 11.

The second form of applicant's warning circuit which is disclosed herein is similar, in that a transistor and a network of resistors connecting the base and the emitter of the transistor to circuit elements of an automobile are used to discriminate between normal or desired circuit conditions and an undesired circuit condition. In this case, the circuit is even more versatile than that just described since it uses only a single transistor to protect any number of conventional circuits within the automobile, and since it is further able to discriminate between four circuit conditions, three of which are desirable and one undesirable. The device of FIG. 2 gives a warning when, and only when, the ignition switch 50 is open and any number of the switches 12, 12', and 12'' are closed. The purpose of this warning device is to prevent the driver from accidentally leaving any of the electrical devices in operation when the engine is not running, so that the battery 24 will not be discharged. As noted above, when there are two switches 12 and 50 in a circuit, there are four possible combinations of switch positions. For each position of ignition switch 50 there are two possible positions for switch 12. The only combination which will run down the battery in normal operation is that in which switch 50 is open and a switch 12 is closed. Accordingly, it is desired that a collector current should flow through control coil 51 to close relay contact switch 52 only when this circuit condition obtains as to one or more of switches 12, 12', and 12''. The closing of the relay contacts, designated as 52, completes a circuit between positive pole 25 of battery 24 and warning device 53 which is grounded at 54 to the negative pole 26 of battery 24.

The transistor 60 used in the circuit of FIG. 2 is an NPN transistor, in which the base 61 must be positive with respect to the emitter 62 in order to permit current to flow in the base-emitter circuit. Again, it is inherent that no current will flow through collector 63 unless there is a current in the base-emitter circuit. The emitter 62 is provided with parallel resistors 70 and 71. In a typical case, resistor 71 has one-tenth the resistance of resistor 70, and is provided with a ground connection 72 to the negative terminal 26 of the battery. Resistor 70 is connected at 73 to the side of ignition switch 50 which is connected to the positive terminal 25 of battery 24 only when switch 50 is closed. Switch 50 is also connected at 73 to ignition system 56, which is provided with its own ground connection 57 in the conventional manner. (57 schematically represents all such ground connections.)

The base 61 of transistor 60 is connected through resistor 81 to ground 80, and through respective resistors 82, 82' and 82'' to switches 12, 12' and 12'' between the switches and electrical devices 11, 11' and 11'' here shown as lamps, having respective negative ground connections 21, 21' and 21''. Resistor 81 will typically have about the same resistance as resistor 71, while resistors 82, 82', etc., will typically have more resistance than resistor 70.

In operation, the transistor 60 of FIG. 2 must have a base terminal 61 which is positive with respect to emitter terminal 62 in order for current to flow at the collector terminal 63. The emitter is connected to the negative terminal 26 of the battery through a relatively low resistance 71 and ground connection 72. The emitter is also connected to the ignition circuit between the ignition switch 50 and the working parts of the circuit 56, through a relatively high resistance 70. Since there is also substantial resistance in the ignition system 56, but not in switch 50, this is effectively a connection to positive terminal 25 of the battery 24, if switch 50 is closed. Otherwise it is effectively a connection to the negative terminal 26 of the battery through grounds 57 and 27.

Base terminal 61 is connected to negative ground at 80, through relatively low resistance 81, and is also connected to the positive terminal 25 through the relatively high resistances 82, 82' and 82'' and switches 12, 12' and 12''. The positive connection to the base has much more resistance than the negative connection to the emitter, even when several switches 12, 12' are closed to furnish parallel positive connections.

With all switches off, both the emitter and the base are connected only to the negative terminal 26 of the battery through the various ground connections. If all of the switches 12 are left open and the ignition switch 50 is closed, the emitter has a connection with the positive terminal 25 of the battery 24, and while the connection is through a high resistance 70, it is the only point at which the base-emitter circuit is connected to the positive terminal. Consequently, the emitter is thereby made positive with respect to the base. No current will flow either in the base-emitter circuit or in the collector circuit of the transistor, and the warning device will not be actuated. With each switch 12, 12' or 12" which is turned on, a connection is made from the positive terminal 25 of the battery 24 to base 61, through a high resistance 82, 82' or 82". Resistances 82 are sufficiently high, and sufficiently greater than those of the electrical devices 11, 11' and 11", so that even with every switch 12 closed, the base 61 of the transistor is no more positive than the emitter 62, especially since it is also connected through a relatively low resistance 81 to a ground connection 80. Accordingly, as long as switch 50 remains closed the base is negative with respect to the emitter because of the relatively low resistance at 81 as compared with any possible combinations of high resistances 82.

However, if switch 50 is open while any switch 12 remains closed, the emitter 62 is connected only to the negative terminal of the battery while the base 61 remains connected to the positive terminal 25 of the battery through one or more resistances 82. Accordingly, the base is less negatively biased than the emitter, or positive with respect to the emitter, and a base-emitter current will flow. This in turn, permits the flow of collector current through relay control coil 51 and relay contacts 52 will close to actuate warning device 53.

Thus, the only circuit condition which will actuate the warning device is one in which the ignition switch is open while a switch 12 to some other electrical device is closed, and the driver will be warned to open all of the switches 12 before leaving the vehicle.

Values which applicant has used successfully in the circuit of FIG. 2 are 10 ohms for resistor 71, 100 ohms for resistor 70, 10 ohms for resistor 81, 120 ohms for resistors 82, 82', 82", etc. The relay coil has a resistance of 500 ohms, and is in series with a resistor 55 having a resistance of 220 ohms in series with relay coil 51 to limit the current. Resistance 55 is optional, and may be used to limit the collector current or to limit the sensitivity of the circuit to the desired value.

These circuits provide a simple but effective means of warning a driver of an undesired circuit condition, with a minimum of complexity.

What is claimed is:

1. A circuit for warning a driver of an undersired condition in an electrical system of an automobile, comprising a battery, an electrical device, a transistor, a warning device and a relay switch having a control coil for actuating the warning device, said control coil being connected to the collector terminal of said transistor, the collector current of said transistor controlling the passage of current through the control coil of said relay; said battery, said switch, said electrical device, and the emitter and base of said transistor being interconnected through conductors and resistors having preselected resistances adapted to permit a collector current to flow in said transistor only when an undesired circuit condition occurs in the circuit between said switch and said electrical device, whereby to close said relay and actuate said warning device, the number of transistors connected to the control coil of said relay being equal to the number of electrical devices and switches, the same terminal of said battery being connected to each said switch, the other terminal of said switch being connected to said electrical device and to the emitter terminal of said transistor through a resistor of a value sufficient to cause a voltage drop of .3 of a volt, the base terminal of said transistor being connected to the center movable contact of a 25 ohm potentiometer, said terminal of said switch which is connected to said electrical device being connected to one end terminal of said potentiometer, and the other end terminal of said potentiometer being connected to a 220 ohm resistor, said 220 ohm resistor being connected to the other terminal of said battery through a ground connection, said control coil of said relay having a resistance of 500 ohms, the terminal of said control coil which is not connected to the collector terminal of said transistor being connected to a 220 ohm resistor, said 220 ohm resistor being connected to the other terminal of said battery through a ground connection, whereby when the said switch is closed and the electrical device is incapable of passing a current a collector current flows in said transistor to actuate said relay and said warning device.

2. The device of claim 1 in which a diode is interposed between the collector terminal of said transistor and said relay control coil, to prevent damage to said transistor by temporary reverse currents.

3. A circuit for warning a driver of an undesired condition in an electrical system of an automobile, comprising a battery, an electrical device, a switch for said electrical device, a transistor, a warning device, and a relay switch having a control coil for actuating the warning device, said control coil being connected to the collector terminal of said transistor, the collector current of said transistor controling the passage of current through the control coil of said relay; said battery, said switch, said electrical device, and the emitter and base of said transistor being interconnected through conductors and resistors having preselected resistances adapted to permit a collector current to flow in said transistor only when an undesired circuit condition occurs in the circuit between said switch and said electrical device, whereby to close said relay and actuate said warning device, a plurality of said electrical devices and their switches being connected to said relay coil through one said transistor, a first pole of said battery being connected to one terminal of said switch, the other terminal of said switch being connected to said electrical device and to a 120 ohm resistor, said 120 ohm resistor being connected to the base terminal of said transistor, the base terminal of said transistor also being connected to a 10 ohm resistor, the other terminal of said 10 ohm resistor being connected to the second pole of said battery through a ground connection, the emitter terminal of said transistor being connected to a 100 ohm resistor and to a 10 ohm resistor, said 10 ohm resistor being connected to the second terminal of said battery through a ground connection, said 100 ohm resistor being connected to a terminal of an ignition switch which receives voltage from the first terminal of said battery only when said ignition switch is closed, said relay control coil having a resistance of 500 ohms, said terminal of said control coil which is not connected to the collector terminal of said transistor being connected to a 220 ohm resistor, the other terminal of said 220 ohm resistor being connected to the first terminal of said battery, whereby a collector current will flow in said transistor only when said ignition switch is open and said switch for said electrical device is closed, actuating said relay and said warning device.

References Cited by the Examiner

UNITED STATES PATENTS 2,959,709 11/1960 Vanaman et al. _____ 315—83
2,994,073 7/1961 Pelovitz _____ 340—213
3,038,106 6/1962 Cutsogeorge et al. \_\_ 317—148.5

NEIL C. READ, *Primary Examiner.*

A. H. WARING, *Assistant Examiner.*